United States Patent [19]

Cobb

[11] 4,282,624
[45] Aug. 11, 1981

[54] OIL FIELD STORAGE TANK ATTACHMENT FOR CLEANING

[76] Inventor: James R. Cobb, 1449 Williams Cir., Oklahoma City, Okla. 73119

[21] Appl. No.: 87,407

[22] Filed: Oct. 22, 1979

[51] Int. Cl.³ .............................................. B08B 11/00
[52] U.S. Cl. ................................................. 15/210 B
[58] Field of Search ................... 15/210 B, 256.6, 245, 15/114, 246

[56] References Cited

U.S. PATENT DOCUMENTS

| | | | |
|---|---|---|---|
| 2,201,517 | 5/1940 | Bow | 15/210 B |
| 2,391,980 | 1/1946 | Knapp | 15/210 B |
| 2,424,046 | 7/1947 | Moore et al. | |
| 2,440,571 | 4/1948 | Bow | 15/210 B |
| 2,504,563 | 4/1950 | Menke | |
| 2,662,700 | 12/1953 | Higgins | |
| 2,709,918 | 6/1955 | Yetter | |
| 2,762,075 | 9/1956 | Bratton | 15/210 B |
| 2,779,045 | 1/1957 | Harvey | |
| 2,809,012 | 10/1957 | Stevens | |
| 3,098,384 | 7/1963 | Nusbaum | |

*Primary Examiner*—Edward L. Roberts
*Attorney, Agent, or Firm*—Dunlap, Codding & McCarthy

[57] ABSTRACT

An apparatus for cleaning a measuring tape, used for measuring the depth of oil in a storage tank and partially immersed in the oil for this purpose, is mounted in the tank beneath a hatch in the top of the tank. The tape is cleaned by drawing it through a cut in a rubber plate which is supported on three sides and partially on a fourth side by a metal plate used to mount the apparatus on the tank. The cut communicates with the fourth side of the rubber plate so that the metal plate positions the sides of the cut while permitting the tape to be inserted into the cut at any position along the length of the tape.

4 Claims, 9 Drawing Figures

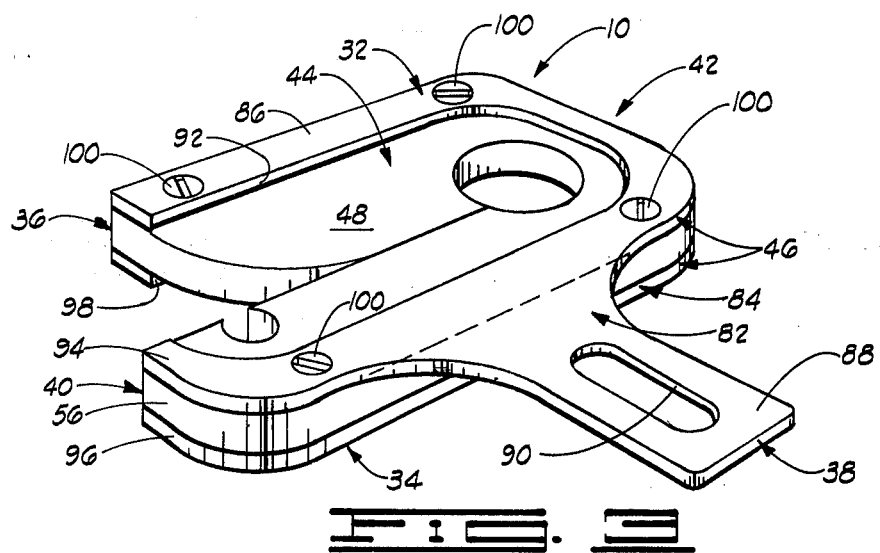
FIG. 3
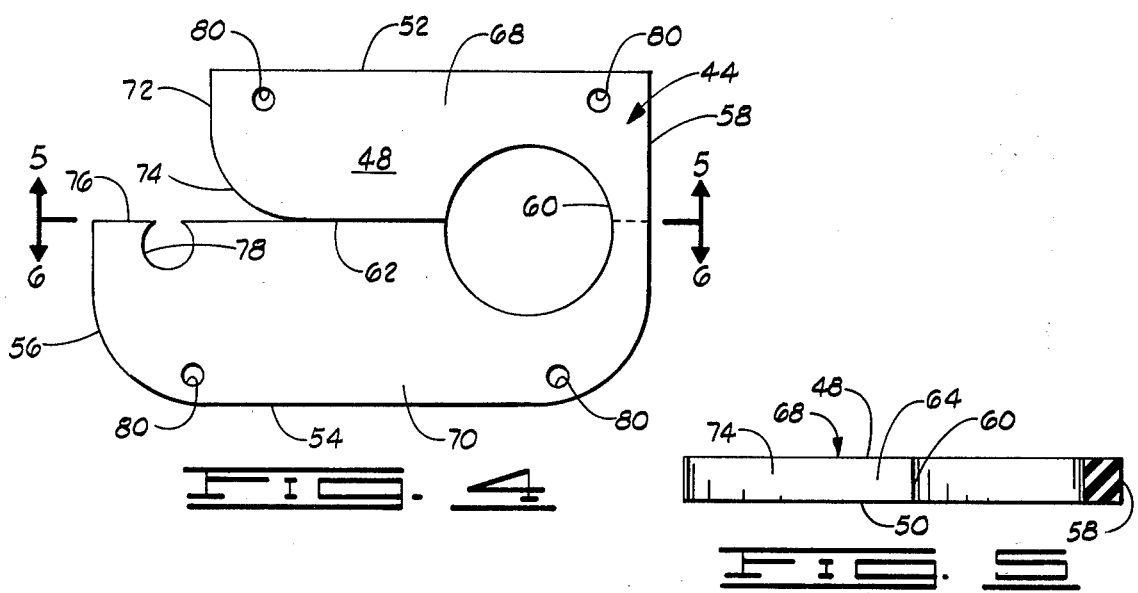
FIG. 4
FIG. 5
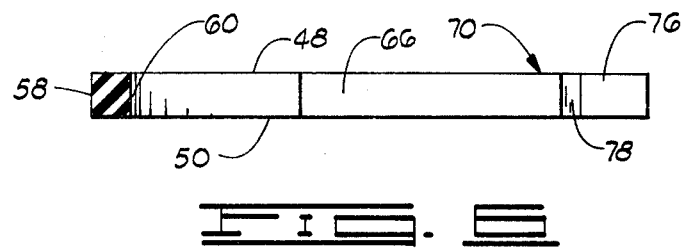
FIG. 6

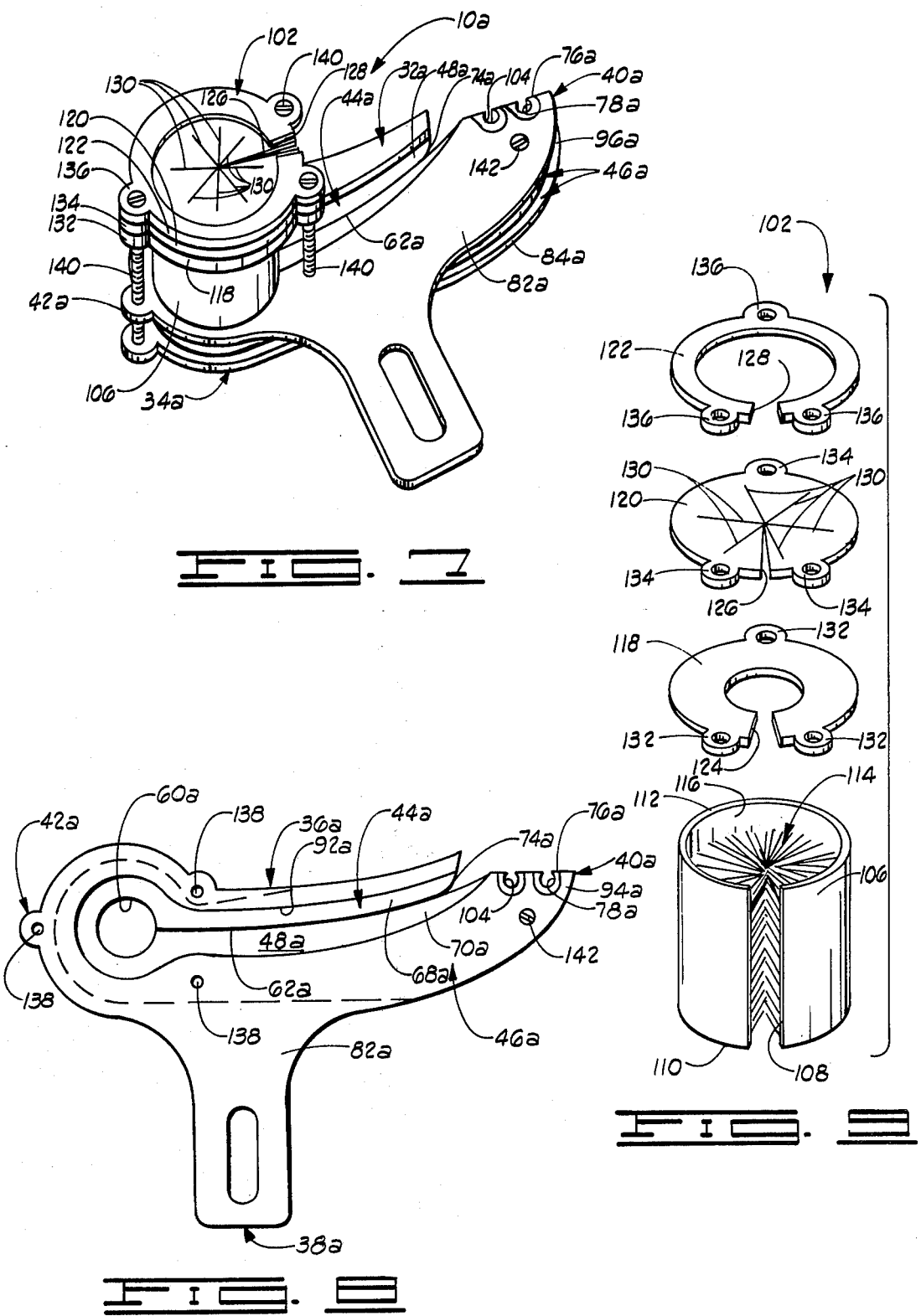

OIL FIELD STORAGE TANK ATTACHMENT FOR CLEANING

BACKGROUND OF THE INVENTION

1. Field of the Invention

The present invention relates generally to cleaning devices and, more particularly, but not by way of limitation, to devices utilized for stripping oil from a measuring tape used to measure the depth of oil in a tank and partially immersed in the oil for this purpose.

2. Brief Description of the Prior Art

Liquids, such as crude oil and the like, are commonly stored in large tanks and it is common practice for the quantity of liquid in a tank to be periodically measured. In many cases, this measurement is carried out by a workman who will visit the tank and make a direct measurement of the depth of the liquid it contains so that the volume of the liquid can be calculated. Access to the liquid is through a hatch at the top of the tank and the depth measurement is carried out by lowering a plumb bob, on the end of a measuring tape, through the hatch to the bottom of the tank. The liquid will coat that portion of the tape which enters the liquid so that the length of the coated portion of the tape, such length being given directly by markings on the tape, provides a direct measurement of the depth of liquid in the tank.

It is also common practice to monitor the quality of the stored liquid through sampling and, in some cases, it will be necessary to take samples at various depths in the liquid. For example, crude oil will stratify during storage so that, at times, it will be important to take a sample from a location near the bottom of the tank or from some other depth. The sample is taken by means of a container, commonly called a thief, which can be lowered to the desired depth at the end of a rope and which takes the sample at that depth.

It is, of course, necessary to clean the various implements used in measuring the depth of liquid in a tank and used for retrieving a sample from the tank after the use of these implements. It is generally not desired that oil be allowed to drip on the top of the tank nor is it desirable to a workman to carry an implement which is dripping oil. In the past, rags have often been used to wipe these implements but, because of the length of a measuring tape, such wiping is a tedious process. To avoid this wiping process, devices have been developed to automatically wipe a measuring tape as it is withdrawn from a tank. For example, U.S. Pat. No. 2,779,045, issued Jan. 29, 1957 to Harvey, discloses a device having a measuring tape, means for wiping the measuring tape as it is withdrawn from a tank, and a case for receiving the plumb bob on the end of the measuring tape. However, devices of this type have a couple of disadvantages. Such devices tend to be bulky and accordingly undesirable for transporting and, moreover, such devices provide for stripping of oil from the measuring tape outside the tank. On windy days, oil stripped from the measuring tape can be blown on to the top of the tank.

SUMMARY OF THE INVENTION

The present invention overcomes these disadvantages by providing a cleaning apparatus which is mounted inside the tank and is accessable through the hatch via which the depth of the oil in the tank is measured. More particularly, the apparatus of the present invention includes an elastomeric wiper in which a cut is formed to extend between the top and bottom surfaces of the wiper so that the cut provides internal wiping faces between which a measuring tape can be drawn. In order that these wiping faces are accessable to the workman, the cut extends to one side of the wiper to permit the workman to insert any portion of the measuring tape into the cut from such side. Thus, the workman can lower the plumb bob to the bottom of the tank and rapidly retrieve it until oil coated portions of the tape are observed and, at this time, insert the tape into the cut in the wiper and continue retrieval. As the retrieval is continued, the wiper faces formed via the cut strip oil into the tank. The cut terminates in the interior of the wiper in a circular aperture sized to mate with the plumb bob so that, when the plumb bob reaches the wiper, the workman can shift the measuring tape and plumb bob to draw the plumb bob through the circular aperture in the wiper. The apparatus of the present invention further is provided with substantially circular notches, formed in the surface of the wiper and extending between the top and bottom surfaces thereof, to permit cleaning of the rope by means of which a thief is lowered into the tank.

An object of the present invention is to provide an apparatus for cleaning implements lowered into an oil storage tank as such implements are withdrawn from the tank.

Another object of the present invention is to provide a cleaning apparatus which is permanently mounted within the oil storage tank.

Yet another object of the invention is to provide a cleaning apparatus which provides access to cleaning surfaces therein to any portion of a measuring tape which is lowered into an oil storage tank.

Yet a further object of the invention is to include means for cleaning the rope by means of which a thief is lowered into an oil storage tank in a device for cleaning measuring tapes lowered into such a tank.

Other objects, advantages and features of the present invention will be clear from the following detailed description of the preferred embodiments of the invention when read in conjunction with the drawings and appended claims.

BRIEF DESCRIPTION OF THE DRAWINGS

FIG. 3 is an isometric view of one preferred embodiment of the cleaning apparatus of the present invention.

FIG. 4 is a plan view of the wiper of the apparatus shown in FIG. 3.

FIG. 5 is a cross section of the wiper shown in FIG. 4 taken along line 5—5 in FIG. 4.

FIG. 6 is a cross section of the wiper shown in FIG. 4 taken along line 6—6 of FIG. 4.

FIG. 7 is an isometric view of a second embodiment of the cleaning apparatus of the present invention.

FIG. 8 is a plan view of the wiper and wiper support portions of the cleaning apparatus of FIG. 7.

FIG. 9 is an exploded view of the brush assembly of the apparatus shown in FIG. 7.

DESCRIPTION OF FIGS. 1 THROUGH 6

Figure 1:
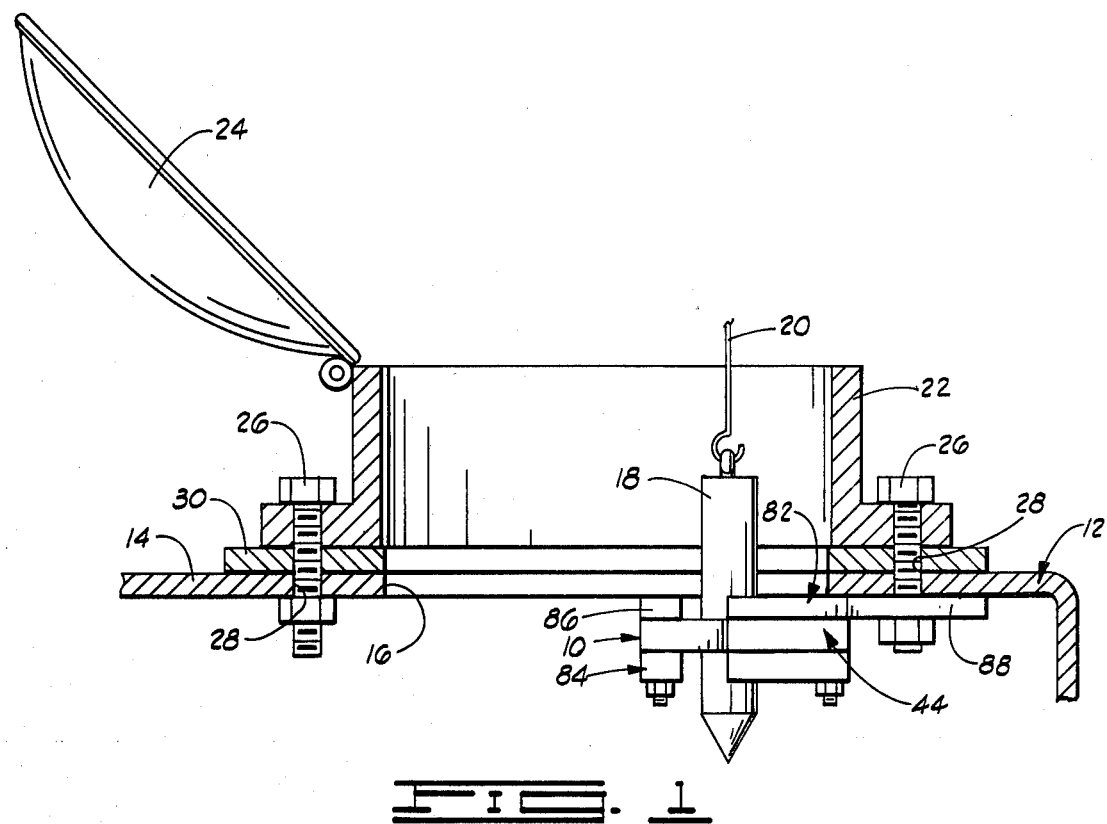
FIG. 1 is a cross section in side elevation of a portion of the top of a liquid storage tank showing the mounting of the apparatus of the present invention thereon.
Figure 2:
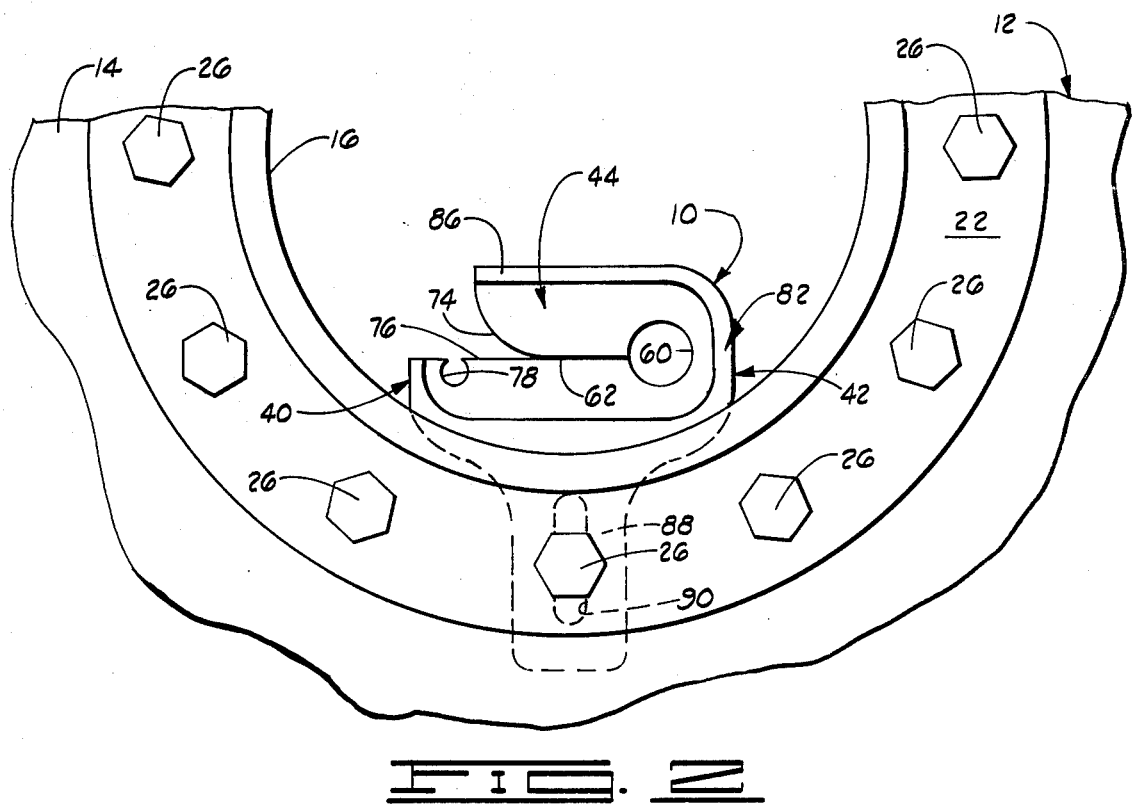
FIG. 2 is a partial plan view of the portion of the top of a liquid storage tank shown in FIG. 1 and also showing the mounting of the apparatus of the present invention thereon.

Referring now to FIGS. 1 through 6 in general and to FIGS. 1 and 2 in particular, shown therein and designated by the general reference numeral 10 is a cleaning apparatus constructed in accordance with the present invention and the mounting of the apparatus 10 on an oil storage tank generally designated by the numeral 12 in FIGS. 1 and 2. The tank 12 generally has a sheet metal top 14 through which a circular aperture 16 is formed to provide access for depth measuring and sampling implements; for example, for a plumb bob 18 and measuring tape 20 shown in FIG. 1.

It is common for a collar 22, having a lid 24 pivotally mounted thereon, to be mounted on the top 14 of the tank 12 about the aperture 16 via bolts 26 which extend through holes 28 formed in the top 14 of the tank 12. A gasket 30 is generally disposed between the top 14 of the tank 12 and the collar 22. It is convenient for the apparatus 10 to be mounted within the tank 12 via one of the bolts 26 as will be discussed below.

The cleaning apparatus 10, which is more particularly shown in FIGS. 3 through 6, generally has a top 32, a bottom 34, a first end 36, an opposing second end 38, a first side 40 and an opposing second side 42 and the cleaning apparatus 10 comprises a wiper 44 and a wiper support 46. (As used herein, the terms "top" and "bottom" refer to uppermost and lowermost portions of the cleaning apparatus 10, and elements thereof, at such times that the cleaning apparatus 10 is mounted on the tank 12). The wiper 44 is constructed of an elastomeric material, such as neoprene, and has a generally plate-like structure. That is, the wiper 44 has a planar top surface 48 and a substantially parallel, planar bottom surface 50 (FIGS. 5 and 6). The wiper 44 further has a first end 52 coincident with the first end 36 of the cleaning apparatus 10, a second end 54 disposed medially of the ends 36, 38 of the cleaning apparatus 10, and first and second sides, 56 and 58 respectively, which are generally coincident with the first and second sides, 40 and 42 respectively, of the cleaning apparatus 10.

Near the second side 58 of the wiper 44, a circular aperture 60 is formed through the wiper 44, the aperture 60 intersecting the top and bottom surfaces, 48 and 50 respectively, of the wiper 44 substantially perpendicularly and extending therebetween. The diameter of the aperture 60 is selected to be substantially equal to the diameter of the plumb bob 18 so that, as indicated in FIG. 1, the plumb bob 18 can be drawn through the wiper 44 for cleaning purposes.

A cut 62, intersecting the side of the aperture 60 opposite the second side 58 of the wiper 44, is formed between the top and bottom surfaces, 48 and 50 respectively, of the wiper 44 so as to form abutting first and second wiper faces, 64 (FIG. 5) and 66 (FIG. 6) respectively, adjacent the aperture 60 and extending between the top and bottom surfaces, 48 and 50 respectively, of the wiper 44.

The cut 62 and the aperture 60 generally divide the wiper 44 into a first portion 68, adjacent the first end 52 of the wiper 44, on which the first wiper face 64 is formed and a second portion 70, adjacent the second end 54 of the wiper 44, on which the second wiper face 66 is formed. (A dotted line has been drawn between the aperture 60 and the second side 58 of the wiper 44 in FIG. 4 to indicate the division of the wiper 44 into first and second portions). As shown in FIG. 4, the first portion 68 of the wiper 44 does not extend to the first side 56 of the wiper 44; rather, the first portion 68 of the wiper 44 terminates in a butt end 72 displaced a selected distance from the first side 56 of the wiper 44. An arcuate surface 74 is formed between the top surface 48 and the bottom surface 50 of the wiper 44 and extends from the butt end 72 of the wiper 44 to fair into the first wiper face 64 so that the cut 62 communicates with the first side 56 of the wiper 44. The second portion 70 of the wiper 44 extends to the first side 56 of the wiper 44 so that the second portion 70 of the wiper 44 projects laterally of the first portion 68 at the first side 56 of the wiper 44. The projection of the second portion 70 of the wiper 44 laterally of the first portion 68 thereof exposes portions of the second portion 70 of the wiper 44 between the second wiper face 66 and the first side 56 of the wiper 44 and a substantially planar face 76, contiguous with the second wiper face 66, is formed on such exposed portion of the second portion 70 of the wiper 44. A substantially circular notch 78 is formed in the face 76 to extend between the top and bottom surfaces, 48 and 50 respectively, of the wiper 44 and the diameter of the notch 78 is selected to be substantially equal to the diameter of the rope by means of which a thief is lowered into the tank 12. The formation of the notch 78 in the face 76 makes the notch 78 accessible from the exterior of the cleaning apparatus 10 and the disposition of the notch 78 to extend between the top and bottom surfaces facilitates the drawing of a rope through the notch 78. The fairing of the first wiper face 64 into the arcuate surface 74 results in the first portion 68 of the wiper 44 curving away from the second portion 70 near the first side 56 of the wiper 44 to facilitate access to the wiper faces 64, 66 from the first side 56 of the wiper 44. A plurality of holes 80 are formed through the wiper 44, from the top surface 48 thereof to the bottom surface 50 thereof, near the ends 52, 54 of the wiper 44 to permit the wiper 44 to be secured to the wiper support 46 as will be discussed below.

The wiper support 46 (FIG. 3) comprises a tank mounting plate, which is preferably mounted on the top surface 48 of the wiper 44, and a wiper securing plate 84, which is preferably mounted on the bottom surface 50 of the wiper 44 so as to sandwich the wiper 44 between the tank mounting plate 82 and the wiper securing plate 84. (As will be clear from the discussion to follow, the tank mounting plate 82 can be mounted on the bottom surface 50 of the wiper 44 and the wiper securing plate 84 can be mounted on the top surface 48 of the wiper 44. It is preferable to mount the tank mounting plate 82 on the top surface 48 of the wiper 44 and to mount the wiper securing plate 84 on the bottom surface 50 of the wiper 44 for a purpose to be discussed below). The tank mounting plate comprises a first portion 86 adjacent the first end 36 of the cleaning apparatus 10 and a second portion 88 extending from the first portion 86 to the second end 38 of the cleaning apparatus 10. (A dashed line has been drawn in FIG. 3 to indicate the general division of the tank mounting plate 82 into the first and second portions 86 and 88). A longitudinally extending slot 90 is formed in the second portion 88 of the tank mounting plate 82 to permit the cleaning apparatus 10 to be mounted on the tank 12 via one of the bolts 26 as has been indicated in FIGS. 1 and 2. As shown therein, the cleaning apparatus 10 is positioned within the tank 12 so that the wiper 44 underlies the aperture 16 in the top 14 of the tank 12 and is disposed at one side of the aperture 16.

As shown in FIG. 3, the first portion 86 of the tank mounting plate 82 has the same general outer contour as the wiper 44 and has a transverse, generally U-shaped slot partially opening to the first side 40 of the wiper 44 so as to leave unobstructed central portions of the wiper 44 wherein the cut 62 and the aperture 60 are located. The partial opening of the slot 92 to the first side 40 of the cleaning apparatus 10 prevents obstruction by the tank mounting plate 82 to the insertion of the measuring tape 20 into the cut 62. A hook shaped portion 94 of the first portion 86 of the tank mounting plate 82 extends along the top of the second portion 70 of the wiper 44 at the first side 40 of the cleaning apparatus 10 and terminates at the face 76 formed contiguously with the second wiper face 66. That is, the hook shaped portion 94 extends along the top of the second portion 70 of the wiper 44 between the notch 78 formed in the face 76 and the first side 56 of the wiper 44. The wiper securing plate 84 is identical to the first portion 86 of the tank mounting plate 82 so that the wiper securing plate 84 similarly has a hook shaped portion 96 disposed between the notch 78 and the first side 56 of the wiper 44. The hook shaped portion 94 and 96 of the tank mounting plate 82 and wiper securing plate 84 respectively provide support for portions of the wiper 44 adjacent the notch 78 when a rope is drawn through the notch 78 to remove oil from such rope. A plurality of holes (not shown) are formed in portions of the tank mounting plate 82 which outline the transverse slot 92 and similar holes (not shown) are formed in portions of the wiper securing plate 84 outlining a similar transverse slot 98 formed in the wiper securing plate 84, such holes aligning with the holes 80 in the wiper 44. The cleaning apparatus 10 is assembled via flat head screws 100 which extend through the holes 80 formed in the wiper 44 and the corresponding holes (not shown) formed in the tank mounting plate 82 and the wiper securing plate 84. The mounting of the tank mounting plate 82 on the top surface 48 of the wiper 44 via flat head screws 100 provides the top 32 of the cleaning apparatus 10 with a flat surface which permits the cleaning apparatus 10 to be mounted in the tank 12 in close proximity to the aperture 16 formed through the top 14 of the tank 12.

Operation of FIGS. 1 through 6

Referring once again to FIGS. 1 and 2, the above described structure of the cleaning apparatus 10 and the mounting of the cleaning apparatus 10 on the tank 12 via the slot 90 in the second portion 88 of the tank mounting plate 82 disposes the wiper faces 64, 66 (not shown in FIGS. 1 and 2) formed by the cut 62 along substantially vertical planes aligned with portions of the aperture 16 through the top 14 of the tank 12 near one side of the aperture 16. The circular aperture 60 formed through the wiper 44 and the notch 78 formed in the face 76 of the wiper 44 are similarly disposed by such mounting about substantially vertical axes aligned with a portion of the aperture 16 formed through the top 14 of the tank 12.

At such times that a measuring tape 20 and plumb bob 18 are used to measure the depth of liquid in the tank 12, the plumb bob is lowered to the bottom of the tank 12 so that a portion of the measuring tape 20, indicating the depth of liquid in the tank 12, is coated with such liquid. The tape 20 is then withdrawn by, for example, winding the tape 20 on a reel (not shown) until the liquid-coated portion of the tape 20 is observed by the workman who is measuring the depth of liquid in the tank 12. After making note of the depth of liquid in the tank 12, the workman inserts the tape 20 into the cut 62 via the first side 40 of the cleaning apparatus 10 and the arcuate surface 74 formed on the first portion 68 of the wiper 44 facilitates such insertion of the tape 20 into the cut 62. The withdrawal of the tape 20 is then continued and the engagement of the tape 20 with the wiper faces formed by the cut 62 strips liquid from the tape 20 into the tank 12. When the tape 20 has been withdrawn to a position such that the plumb bob 18 is brought to a position adjacent the bottom surface 50 of the wiper 44, the workman shifts the tape 20 and plumb bob 18 toward the second side 42 of the cleaning apparatus 10 to bring the plumb bob 18 into alignment with the circular aperture 60 formed through the wiper 44. The plumb bob 18 is then drawn through the circular aperture 60 to strip the major part of liquid clinging to the plumb bob 18 therefrom. A rag or the like can then be used to remove remaining liquid from the plumb bob 18.

At such times that a thief is used to take a sample of the liquid in the tank 12, the rope by means of which the thief is lowered into the tank is inserted into the notch 78 before liquid coated portions of the rope reach the height of the cleaning apparatus 10. The rope is then withdrawn from the tank 12 through the notch 78 to strip a major portion of oil clinging to the rope therefrom. Liquid can be removed from the thief by means of a rag or the like.

Description of FIGS. 7, 8 and 9

Referring now to FIG. 7, 8 and 9, shown therein and designated by the reference numeral 10a is a second embodiment of a cleaning apparatus constructed in accordance with the present invention. The cleaning apparatus 10a includes, in addition to a wiper 44a, which is similar to the wiper 44, and a wiper support 46a, which is similar to the wiper support 46, a brush assembly 102. The wiper 44a and the wiper support 46a are shaped somewhat differently than the wiper 44 and wiper support 46 and FIG. 8 has been included to show the form of the wiper 44a and the wiper support 46a. FIG. 9 has been included to show the construction of the brush assembly 102 and FIG. 7 shows the construction of the assembled cleaning apparatus 10a.

The wiper 44a and wiper support 46a include the same features that are included in the wiper 44 and wiper support 46 as well as additional features. The features of the wiper 44a and wiper support 46a which are substantially the same as features of the wiper 44 and wiper support 46a have been designated with the same numerical designations used to designate such features of the wiper 44 and wiper support 46 and such numerical designations have been followed by the letter a in FIGS. 7 and 8. Thus, the assembly formed by the wiper 44a and wiper support 46a has first and second ends, 36a and 38a respectively, which form first and second ends for the cleaning apparatus 10a, first and second sides 40a and 42a respectively, which form first and second sides for the cleaning apparatus 10a, and a top 32a and bottom 34a. The wiper 44a similarly has a substantially planar top surface 48a and an opposed, substantially parallel bottom surface (not shown). A cut 62a is formed through the wiper 44a to intersect the top and bottom surfaces thereof substantially perpendicularly to form internal first and second wiper faces (not shown in FIGS. 7 and 8) in the wiper 44a. (As shown in FIG. 8, the cut 62a can be slightly curved and can be made to have a substantially greater length than was shown for the cut 62 in the wiper 44. The greater length of the cut 62a facilitates withdrawl of the tape 20 through the cut 62a). As in the wiper 44, the cut 62a terminates in the interior of the wiper 44a in a circular aperture 60a which strips liquid from the side of the plumb bob 18. The second portion 70a of the wiper 44a extends laterally of the first portion 68a thereof at the first side 40a of the cleaning apparatus 10a so that a face 76a, contiguous with the second wiper face (not shown in FIGS. 7 and 8) is formed on the wiper 44a adjacent the first side 40a of the cleaning apparatus 10a. As in the wiper 44, a substantially circular notch 78a is formed in the face 76a and extends between the top and bottom surfaces of the wiper 44a. In addition to the notch 78a, a second substantially circular notch 104 is formed in the face 76a. The notch 104 is used, as is the notch 78a, to clean a rope by means of which a thief is lowered into the tank 12 and the purpose of forming two notches in the face 76a is to extend the useful life of the cleaning apparatus 10a. It is anticipated that the greatest wear to the cleaning apparatus 10a will occur from rubbing of the notches 78a and 104 by such rope so that the provision of two notches in the face 76a will double the lifetime of the cleaning apparatus 10a. As in the case for the cleaning apparatus 10, the separation of the wiper 44a into a first portion 68a and a second portion 70a by the cut 62a and the formation of an arcuate surface 74a on the first portion 68a, the arcuate surface 74a curving the first portion 68a away from the second portion 70a near the first side 40a of the cleaning apparatus 10a, communicates the cut 62a with the first side 40a of the cleaning apparatus 10a and facilitates insertion of the tape 20 into the cut 62a.

The wiper support 46a similarly comprises a tank mounting plate 82a which is mounted on top of the wiper 44a and a wiper securing plate 84a which is mounted on the bottom of the wiper 44a. The wiper securing plate 84a is identical to portions of the tank mounting plate 82a near the first end 36a of the cleaning apparatus 10a in the same manner that the wiper securing plate 84 is identical to such a portion of the tank mounting plate 82. The tank mounting plate 82a and the wiper securing plate 84a have hook shaped portions 94a and 96a respectively and these portions extend along the top and bottom of the second portion 70a of the wiper 44a, at the first side 40a of the cleaning apparatus 10a, to terminate at the face 76a wherein the notches 78a and 104 are formed. As shown in FIG. 8, a portion of the hook shaped portion 98a is disposed between the first end 40a of the cleaning apparatus 10a and the notch 78a, a portion of the hook shaped portion 94a is disposed between the notches 78a and 104 and a portion of the hook shaped portion 94a is disposed between the notch 104 and the cut 62a to support the notches 78a and 104 on three sides. The hook shaped portion 96a of the wiper securing plate 84a is similarly formed. As has been shown in FIG. 8, the generally U-shaped slot 92a in the tank mounting plate 82a can be configured to generally follow the outlines of the cut 62a and the aperture 60a in the wiper 44a. A similarly shaped slot (not shown) is formed in the wiper securing plate 84a.

Referring now specifically to FIGS. 7 and 9, the brush assembly 102 comprises a circular tube 106 having a slit 108 formed in the wall thereof between the ends 110, 112 of the tube 106. A plurality of bristles 114, which are preferably made of an elastomeric substance such as neoprene, are secured to the inner circular periphery 116 in any convenient manner such as by means of an epoxy resin. The bristles 114 extend substantially radially toward the center of the tube 106 which, in the assembled cleaning apparatus 10a, is disposed substantially coaxially with the aperture 60a formed through the wiper 44a. In the assembled cleaning apparatus 10a, the slit 108 is directed generally toward the first side 40a of the cleaning apparatus 10a so as to overlay portions of the wiper 44a wherein the cut 62a is formed. Thus, the measuring tape 20 can be drawn into the interior of the tube 106 from the cut 62a via the slit 108 to align the plumb bob 18 with the aperture 60a so that the plumb bob can be drawn through the brush assembly 102.

The brush assembly 102 further comprises: a split ring 118; a diaphragm 120 which is made of an elastomeric material; and a second split ring 122. In the assembled cleaning apparatus 10a, the tube 106 is mounted atop the tank mounting plate 82a and the split ring 118, diaphragm 120 and split ring 122 are mounted, in that order, atop the tube 106. Radially extending slits 124, 126 and 128 are formed in the split ring 118, the diaphragm 120 and the split ring 122 respectively and, in the assembled cleaning apparatus 10a, the slits 124-128 are aligned with the slit 108 of the tube 106 to permit the measuring tape 20 to be drawn into central portions of the brush assembly 102 from the cut 62a in the wiper 44a. A plurality of radially extending cuts 130 are formed through the diaphragm 120 and intersect at the center thereof to permit the plumb bob 18 to be drawn through the diaphragm 120.

Perforated tabs are formed on the peripheries of the split ring 118, the diaphragm 120 and the split ring 122, the tabs of the split ring 118 being designated 132 in the drawings, the tabs of the diaphragm 120 being designated 134 in the drawings, and the tabs of the split ring 122 being designated 136 in the drawing, and the tabs 132, 134 and 136 are positioned to align with holes 138 formed in the tank mounting plate 82a and similar holes (not shown) formed in the wiper securing plate 84a. The cleaning apparatus 10a is then assembled via screws 140 which pass through the perforations in the tabs 132, 134 and 136, the holes 138 and the holes formed in the wiper securing plate 84a and via a screw 142 which passes through holes (not shown) formed in the tank mounting plate 82a, the wiper securing plate 84a and the wiper 44a near the first side 40a of the cleaning apparatus 10a.

The cleaning apparatus 10a is used in the same manner that the cleaning apparatus 10 is used. That is, when a workman who is measuring the depth of liquid in the tank 12 observes the coating of liquid on portions of the tape 20 which have been immersed, he notes the depth of the liquid and then inserts the measuring tape 20 into the cut 62a in the wiper 44 from the first side 40a thereof. The measuring tape 20 is then retrieved until the plumb bob 18 reaches a position adjacent the bottom 34a of a cleaning apparatus 10a and, when the plumb bob 18 reaches this position, the measuring tape 20 and plumb bob 18 are moved toward the second side 42a of the cleaning apparatus 10a to align the plumb bob 18 with the aperture 60a formed through the wiper 44a and with the brush assembly 102. The plumb bob 18 is then drawn through the aperture 60a in the wiper 44a and through the brush assembly 102 to remove liquid from the plumb bob 18. The inclusion of the brush assembly 102 is particularly advantageous in that the bristles 114 remove liquid which is adhered to portions of the surface of the plumb bob 18 other than the cylindrical periphery thereof. The diaphragm 120 minimizes the spattering of liquid from the bristles 114 onto cleaned portions of the plumb bob 18. As noted above, when a thief is used to take a sample of liquid from the tank 12, the workman can draw the rope by means of which the thief is lowered into the tank through either notch 78a or notch 104 so that wear occasioned by cleaning the rope, such wear eventually necessitating replacement of at least the wiper 44a, will occur over a greater period of time so that the lifetime of the cleaning apparatus 10a is increased.

It is clear that the present invention is well adapted to carry out the objects and attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. A measuring tape cleaning apparatus for a tank used for storing a liquid, said tank having an aperture formed through the top thereof for admitting a plumb bob attached to one end of a measuring tape into the tank for measuring the depth of liquid in the tank, comprising:

a wiper constructed of an elastomeric material, said wiper having opposed top and bottom surfaces and a cut, communicating with one side of the wiper, formed through the wiper to intersect the top and bottom surfaces thereof, whereby abutting first and second wiper faces accessable from said one side of the wiper are formed internally of the wiper and extend between the top and bottom surfaces of the wiper, wherein the cut formed through the wiper terminates within the wiper at a circular aperture formed through the wiper to intersect the top and bottom surfaces thereof;

a wiper support secured to the wiper, the wiper support adapted for mounting on portions of the tank adjacent the aperture formed through the top thereof so as to align the cut in the wiper with portions of said aperture at one side of said aperture and so as to orient the wiper faces substantially vertically; and a brush assembly adjacent the top of the wiper, said brush assembly comprising:

a circular tube having a slit formed in the wall thereof, said slit extending between the ends of the tube, wherein the tube is disposed coaxially with the circular aperture through the wiper and has an inner diameter greater than the diameter of said circular aperture, and wherein the slit in the circular tube is aligned with the cut formed through the wiper; and a plurality of bristles attached to the inner periphery of said circular tube and extending radially inwardly therefrom.

2. The apparatus of claim 1 wherein the brush assembly further includes a generally circular diaphragm mounted on the end of the circular tube opposite the wiper, said diaphragm having a slit extending from the periphery of the diaphragm to the center thereof, said slit being aligned with the slit in the circular tube, and said diaphragm having a plurality of radially extending cuts formed therethrough and intersecting at the center of the diaphragm.

3. A measuring tape cleaning apparatus for a tank used for storing a liquid, said tank having an aperture formed through the top thereof for admitting a plumb bob attached to one end of a measuring tape into the tank for measuring the depth of liquid in the tank, comprising:

a wiper constructed of an elastomeric material, said wiper having opposed top and bottom surfaces and a cut, communicating with one side of the wiper, formed through the wiper to intersect the top and bottom surfaces thereof, whereby abutting first and second wiper faces accessible from said one side of the wiper are formed internally of the wiper and extend between the top and bottom surfaces of the wiper, wherein a substantially circular notch accessible from the exterior of the apparatus is formed in the wiper to intersect said top and bottom surfaces of the wiper and extend therebetween; and a wiper support secured to the wiper, the wiper support adapted for mounting on portions of the tank adjacent the aperture formed through the top thereof so as to align the cut in the wiper with portions of said aperture at one side of said aperture and so as to orient the wiper faces substantially vertically;

wherein portions of the wiper forming the second wiper face project laterally of portions thereof forming the first wiper face at the side of the wiper which communicates with said cut formed in the wiper; wherein a face is formed on the projecting portions of the wiper contiguously with the second wiper face; and wherein the substantially circular notch is formed in said face formed contiguously with the second wiper face.

4. The apparatus of claim 3 wherein a second substantially circular notch intersecting the top and bottom surfaces of the wiper and extending therebetween is formed in the face formed contiguously with the second wiper face.

* * * * *